United States Patent
Bunch

[11] Patent Number: 5,905,459
[45] Date of Patent: May 18, 1999

[54] METHODS AND APPARATUS FOR STABILIZING RADAR FALSE ALARM RATE

[75] Inventor: Brian Paul Bunch, Peoria, Ariz.

[73] Assignee: Honeywell Inc., Minneapolis, Minn.

[21] Appl. No.: 08/844,484

[22] Filed: Apr. 18, 1997

[51] Int. Cl.$^6$ .................................................... G01S 7/34
[52] U.S. Cl. .............................. 342/92; 342/93; 342/26; 342/205
[58] Field of Search ..................... 342/92, 93, 26, 342/205

[56] References Cited

U.S. PATENT DOCUMENTS

| | | | |
|---|---|---|---|
| 3,643,257 | 2/1972 | Thomson et al. | 342/92 |
| 3,701,154 | 10/1972 | McKinney | 342/93 |
| 3,775,770 | 11/1973 | Dillard et al. | 342/378 |
| 5,311,183 | 5/1994 | Mathews et al. | 342/26 |
| 5,457,462 | 10/1995 | Mitsumoto et al. | 342/93 |

*Primary Examiner*—John B. Sotomayor
*Attorney, Agent, or Firm*—Snell & Wilmer L.L.P.

[57] ABSTRACT

A radar system and method for operation of the same in a manner in which the false alarm rate is stabilized is provided. The system includes an automatic gain control (AGC) processing function which is utilized to control the pre-processed false alarm rate such that the displayed false alarm rate is substantially intolerant to temperature fluctuations.

10 Claims, 6 Drawing Sheets

METHODS AND APPARATUS FOR STABILIZING RADAR FALSE ALARM RATE

BACKGROUND OF THE INVENTION

1. Field of the Invention

The present invention generally relates to radar systems, and more particularly, to methods and apparatuses for stabilizing the automatic gain control (AGC) of a radar receiver and processing radar signals reflected from a target.

2. Description of the Related Art

In World War II, radar systems using centimeter wavelengths were discovered to detect reflections from precipitation, such as rain and hail. Since this discovery, radar systems have developed into extremely useful tools for identifying and classifying weather systems, particularly in the 3 cm to 10 cm wavelength range. For example, a weather radar system is typically installed on an aircraft to identify the conditions within a weather system, such as a cloud, that the aircraft is approaching. Radar waves emitted from the aircraft's radar system reflect from precipitation in the cloud and return to the aircraft. The radar system detects and analyzes the reflected waves to identify the range and characteristics of the cloud. In particular, the power of the reflected signal is proportional to the cloud's reflectivity, which is in turn related to the amount of rainfall within the cloud. Consequently, by timing the delay between the pulse emission and detection and comparing the power of the reflected signal to a series of power thresholds, the range to and characteristics of the cloud may be established.

As the range to the target increases, however, the signal-to-noise ratio drops dramatically. Like any light waves, the intensity of a radar pulse fades in a manner proportional to the square of the distance propagated. The waves are further attenuated due to atmospheric loss and the like. As a result, the signal from distant targets is relatively weak, so that background noise and receiver generated noise, which occurs in every environment, tend to obscure the reflected signal. To extract useful information from distant target reflections, amplification and processing of the detected reflections are consequently necessary to compensate for the lower signal-to-noise ratio. In addition, it is desirable to reduce the receiver generated noise as much as possible to ensure that the displayed signal is accurate and not unduly obscured by such noise (also referred to in this application as false alarms).

In a simple radar system configuration, for example, in commercial airborne weather radar receivers, the radar receiver amplifies both the reflected signal and the noise, but because the reflected signal amplitude is greater than the amplitude of the noise, the amplification magnifies the difference between the signal and the noise, facilitating differentiation between the noise and the reflected signal.

Signals received from the target are also filtered and analyzed for amplitude. The received signal is compared to detection thresholds. If the amplitude of the reflected signal exceeds the detection thresholds, the relevant portion of the signal is treated as potentially relating to a relevant target.

The effectiveness of this system is limited, however, by the characteristics of radar detectors and the signals they detect. In general, the signals received by the antenna and communicated to the receiver are subjected to display processing and automatic gain control (AGC) processing. Typically, the goal of the display processing is to improve the aforementioned signal-to-noise ratio by filtering noise, such as through use of any of a variety of processing techniques, for example an "M-out-of-N" processing scheme, where a display indication is made if M or more returns from N RF transmissions exceed the display threshold. On the other hand, typically, the goal of the AGC function is to control the number of false alarms displayed due to receiver noise. In this way, maximum receiver sensitivity can be ensured without the display of an excessive amount of false indications.

A typical prior art AGC system 100 is depicted in block diagram form as FIG. 1. As shown, an antenna 110 communicates signals received from the target (not shown) to a receiver 112. The output from receiver 112 is then compared to two different thresholds, namely a display threshold by a display comparator 114 and an AGC threshold by an AGC comparator 116. In this typical system, the result of the display threshold comparison is generally processed by a display processor 118, as previously noted, to enhance the signal-to-noise ratio. The result of the AGC threshold comparison, also once processed by an AGC processor 120, is typically used to directly control the receiver gain.

In controlling the receiver gain, competing constraints have heretofore dictated the use of a separate threshold for the AGC function and the display function, such as is illustrated in FIG. 1. Specifically, given that the average data rate in commercial airborne weather radar receivers is low, for example, on the order of one sweep over four (4) seconds, direct control of the false alarm rate with the AGC loop/function creates statistical instabilities due to the low false alarm rate which is equivalent to a low data rate for the AGC function. Accordingly, and with continued reference to FIG. 1, typically the AGC threshold is set to a lower value than the display threshold so as to achieve a higher false alarm rate. In this regard, the false alarm rate can be defined as the percentage of time the receiver output is above the AGC threshold. The AGC threshold is then adjusted such that a 50% false alarm rate yields a desired and acceptable displayed false alarm rate.

This control of the displayed false alarm rate, as previously noted, gives rise to maximum receiver sensitivity. However, it also raises various potential problems. For example, due to the dependence of the required threshold values on receiver linearity and dc offsets, over various temperature ranges, there can be some drift of the displayed false alarm rate. In general, the primary contribution to the false alarm rate, assuming a properly designed receiver, is thermal noise internal to the receiver, thus accounting for the aforementioned temperature dependency. While theoretically the thresholds, i.e., AGC and display thresholds, can be configured to be, and are substantially constant, a dc offset on the output of the receiver may upset the balance. That is, temperature variances which may be encountered through use of the radar system, may result in imbalances.

To avoid such a scenario, i.e., where an unacceptable false alarm rate would be encountered, in general, the receiver sensitivity is simply set lower than ideal to allow for a margin of temperature drift. While limited sensitivity is in and of itself not favorable, other problems also arise. Specifically, often the receiver sensitivity is adjusted through use of an iterative process in which temperature cycles and adjustments are made over anticipated temperature ranges. As will be appreciated by those skilled in the art, such an iterative process is costly, both in manufacture and repair.

Thus, there exists a long-felt and unresolved need for a radar system which addresses the foregoing disadvantages.

SUMMARY OF THE INVENTION

While the way in which the present invention addresses the disadvantages of the prior art will be described in greater detail hereinbelow, in general, a radar system according to various aspects of the present invention comprises an antenna, a receiver, and respective display and automatic gain control (AGC) processing modules, with the receiver output being compared to a display threshold and the result of the display threshold comparison being directed to the display and AGC processing modules. With a system so configured, the pre-processed false alarm rate may be controlled to a predetermined range, and thus, the displayed false alarm rate can be substantially fixed such as to be independent of dc offsets, receiver detector linearity or other factors which are or may be temperature dependent, while obtaining the desired high data rate for the AGC function.

In accordance with a preferred aspect of the invention, the pre-processed false alarm rate is selected in accordance with a fixed relationship between the possibility of a false alarm prior to the display processing and the actual displayed false alarm rate.

Thus, a system according to various aspects of the invention includes the advantages of greater versatility and reduced hardware requirements. Because the receiver sensitivity can be enhanced, no false alarm margin is required. In addition, the time required to produce or repair such systems is reduced, thus reducing production and warranty costs.

These and other advantages of a system according to various aspects of the present invention will be apparent to those skilled in the art upon reading and understanding the following detailed description with reference to the accompanying figures.

BRIEF DESCRIPTION OF THE DRAWING

The subject matter of the invention is particularly pointed out and distinctly claimed in the concluding portion of the specification. Preferred embodiments of the invention, however, both as to organization and method of operation, may best be understood by reference to the following description taken in conjunction with the claims and the accompanying drawing figures, in which like numerals denote like elements and:

DETAILED DESCRIPTION OF AN EXEMPLARY EMBODIMENT OF THE INVENTION

Figure 2:
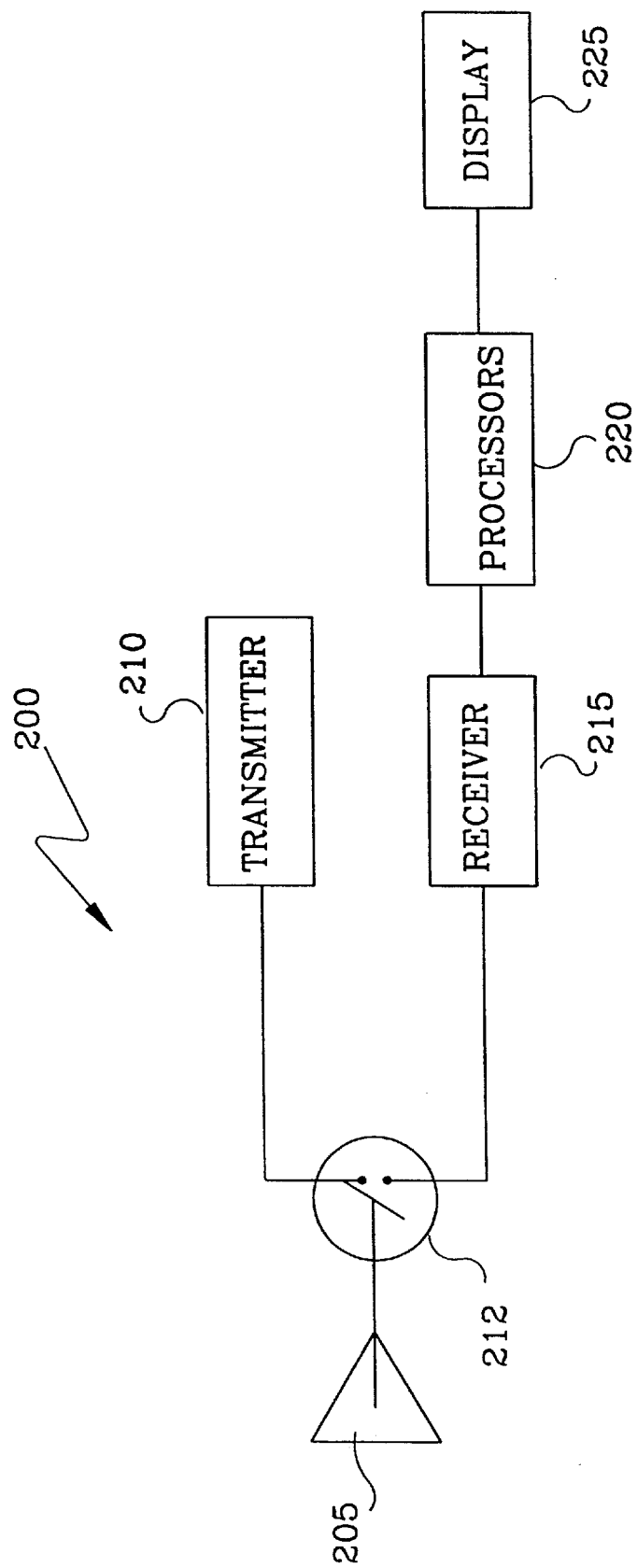
FIG. 2 is a general block diagram of a radar system according to various aspects of the present invention.

Referring now to FIG. 2, a radar system 200 according to various aspects of the present invention comprises: a transducer 205; a transmitter 210 connected to transducer 205 for generating radar signals and providing them to transducer 205; and a receiver 215 for receiving radar signals from transducer 205 for processing and analysis in processor(s) 220 and ultimate display on display 225. Transducer 205 suitably comprises any transducer, for example an antenna, an electromechanical transducer (such as may be used in some applications) or other device. In accordance with a particularly preferred aspect of the present invention, transducer 205 comprises an antenna for radar applications and may be configured for any suitable size, effective aperture area, beamwidths, scan rate and coverage for the particular application. In accordance with this preferred embodiment, antenna 205 is configured as a weather radar antenna compatible with a microwave transmitter 210 and receiver 215, though various aspects of the present invention may be used in innumerable other applications.

Antenna 205 is suitably configured and operates in conjunction with both transmitter 210 for emitting radar waves and receiver 215 for detecting reflected waves. Alternatively, antenna 205 may include multiple antenna for either or both of transmitter 210 and receiver 215. Further, radar system 200 according to various aspects of the present invention is suitably reconfigurable for different sizes and types of antennas.

Receiver 215 is selectively connected to antenna 205 through duplexer 212 to receive detected radar waves emitted by antenna 205 and reflected from a target. It should be noted, however, that the principles of the present invention may be applied to any sort of ranging and tracking system, not merely a weather radar system. In this context, the radar wave may comprise any signal, such as electrical, radio frequency (RF), optical signals. Receiver 215 is suitably configured to amplify weak reflected waves for detection, processing, and display. Preferably, receiver 215 is configured to add minimal noise to the received signal and provide accurate processing and detection of reflected signals.

Figure 3:
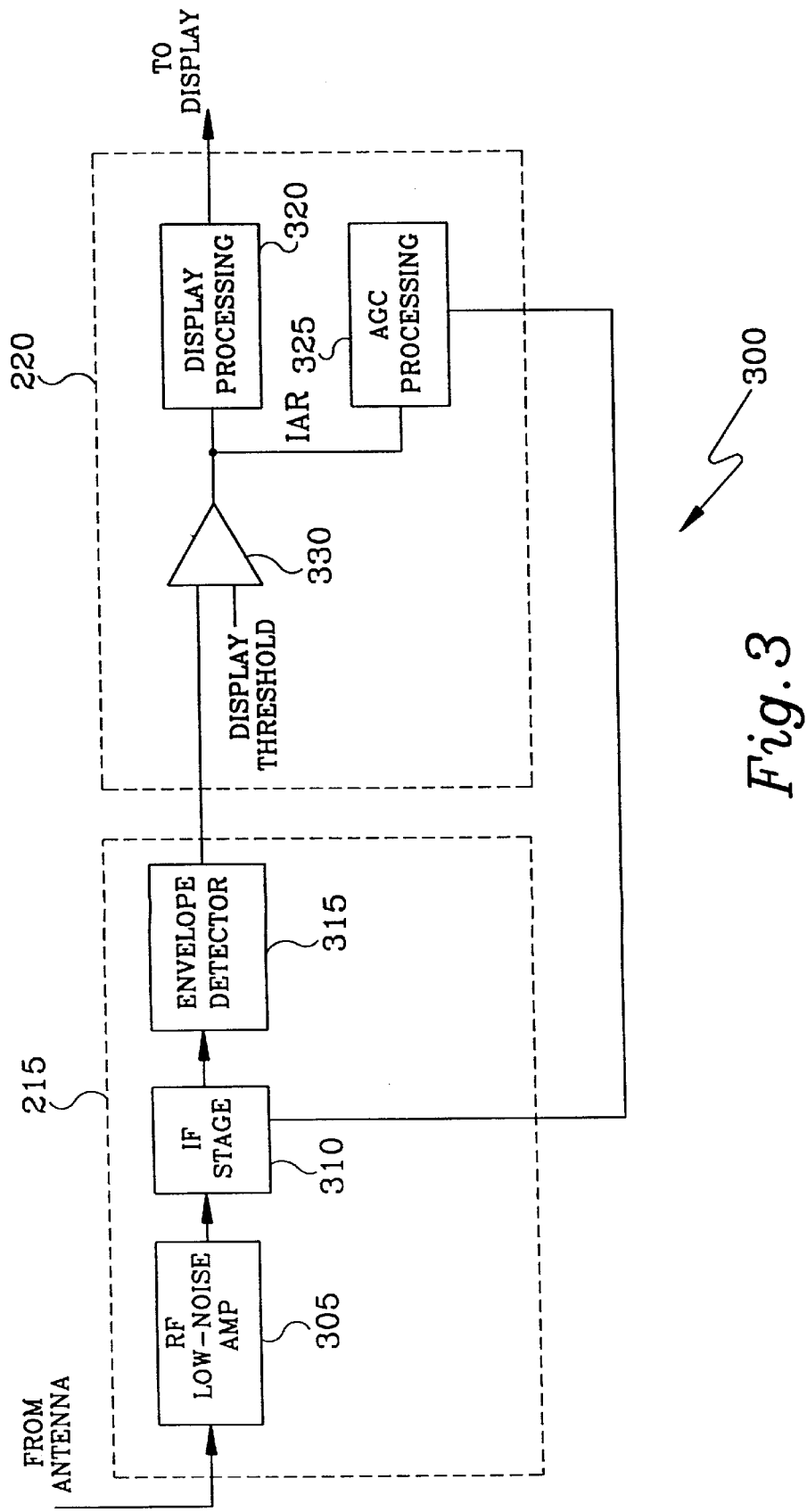
FIG. 3 is a block diagram of the radar receiver system of FIG. 3.

With reference now to FIG. 3, a preferred receiver system 300 in accordance with various aspects of the present invention includes receiver 215 and processor(s) 220. In general, receiver system 300 is configured to provide any signal processing necessary to provide useful information to the operator, including filtration, amplification, pulse compression, detection, analysis, clutter rejection, and display integration. Thus, receiver system 300 amplifies, filters, and analyzes the incoming signals. In this manner, such a signal may be any suitable characteristic of the wave incoming from the target. While typically such signal will comprise a power amplitude, other characteristics may also be advantageously detected.

In accordance with various aspects of the present invention, and with continued reference to FIG. 3, a suitable radar receiver 215 preferably comprises: a radio frequency (RF) low-noise amplifier 305; an intermediate frequency (IF) stage 310; and an envelope detector 315. The RF low-noise amplifier 305 preferably comprises any suitable circuit for amplifying weak RF signals received from antenna 205 with minimal amplification of the noise element of such signals. The IF stage 310 suitably comprises any circuit for converting the radio frequency (RF) signals received from amplifier 305 into an intermediate frequency. For example, IF stage 310 suitably includes a balanced mixer for converting from RF to IF signals. IF stage 310 converts the RF signal to any suitable frequency, for example, 30 or 60 MHZ. In addition, IF stage 310 suitably performs any other desired preliminary processing of the incoming signals, such as filtration and pulse compression, and as discussed more fully below, adjusts the gain of receiver 215 for automatic gain control.

Signals from IF stage 310 are transmitted to envelope detector 315 for detection of signals based on reflected radar waves. Envelope detector 315 comprises any suitable envelope detector 315 for identifying signals based on reflected radar waves, and may use any suitable criteria. For example, envelope detector 315 may be configured as either a linear detector, such as a semiconductor diode detector, or a logarithmic detector, such as a series of cascaded amplifiers. Detection criteria may be based on amplitude, phase and amplitude, in-phase and quadrature components, or any other suitable signal characteristics.

When a signal is detected by envelope detector 315, the signal is transmitted to processor 220, preferably via an analog-to-digital converter (ADC) (not shown). As will be appreciated by those skilled in the art, the ADC converts the analog signals received from envelope detector 315 into digital signals, and as such, the ADC used in the context of the present invention may comprise any suitable ADC having sufficient range and reliability for operations in the environment of radar system 200.

Digital signals corresponding to the analog signals transmitted by envelope detector 315 are received and processed by processor 220, which in general, comprises any suitable central processing unit (CPU). In accordance with various aspects of the present invention, processor 220 performs the main processing tasks for analyzing the signals received by radar receiver 215, delivering useful information to the operator, and controlling the gain of the IF stage 310, as will be explained more fully hereinbelow. As shown, processor 220 preferably includes respective modules and/or processors for performing display processing 320 and automatic gain central processing 325 functions.

Figure 4:
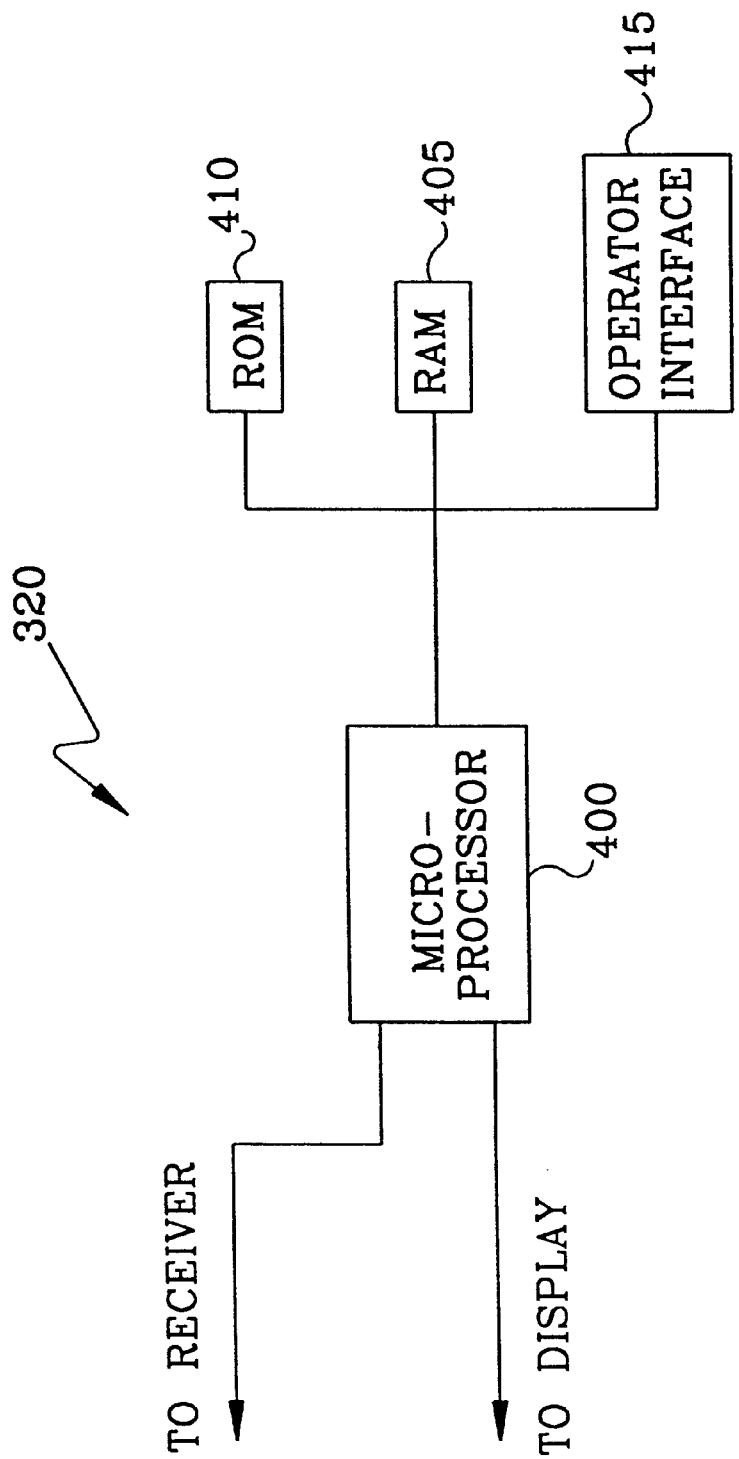
FIG. 4 is a block diagram of the display CPU of the processor of FIG. 3.

With momentary reference to FIG. 4, respective processors 320 and 325 each suitably comprise a processing system including, for example, a number of conventional elements. For purposes of illustration, however, the processing system of display processor 320 is depicted; it should be appreciated that AGC processor 325 may be suitably configured. With reference to FIG. 4, display processor 320 suitably comprises a microprocessor 400, a random access memory (RAM) 405, a read-only memory (ROM) 410, and an operator interface 415. Microprocessor 400 comprises any suitable microprocessor for identifying and classifying the incoming signals. The primary programming for microprocessor 400 is suitably stored in ROM 410, and RAM 405 provides general memory facilities for storage of and access to data and programs by microprocessor 400 during operation. Operator interface 415 suitably comprises an interface for driving any suitable equipment or machinery suitable for providing information to the operator. It should be noted that this configuration of processor 320 is provided herein only as an example and does not attempt to describe all possible configurations of suitable CPUs which may have applicability in the context of the present invention. As those skilled in the art will appreciate, any number of acceptable CPU configurations may be developed to implement the tasks which are to be performed in conjunction with radar system 200 according to various aspects of the present invention.

For example, and with reference to FIG. 3, processor 220 suitably performs several functions, including variably controlling the gain of IF stage 310 and processing the signal, such as by comparing the signals and adjusting the threshold values for time invariant factors from envelope detector 305 to the threshold values. In particular, processor 220 suitably adjusts the gain of the IF stage 310 according to, for example, a suitable AGC processing scheme, as may be stored in the ROM or RAM of AGC processor 325.

In accordance with a preferred aspect of the present invention, and in contradistinction to prior art approaches, processor 220 preferably includes only a single comparator 330 which provides input to processors 320 and 325. Specifically, and with continued reference to FIG. 3, comparator 330 suitably receives the converted digital signal from envelope detector 315 via an ADC and compares that signal to the display threshold. The result of the display threshold comparison is then processed, such as by display processor 320 to, for example, enhance the signal-to-noise ratio and generate the display and by AGC processor 325 to control the gain of receiver 215, e.g. the gain of IF stage 310.

Figure 1:
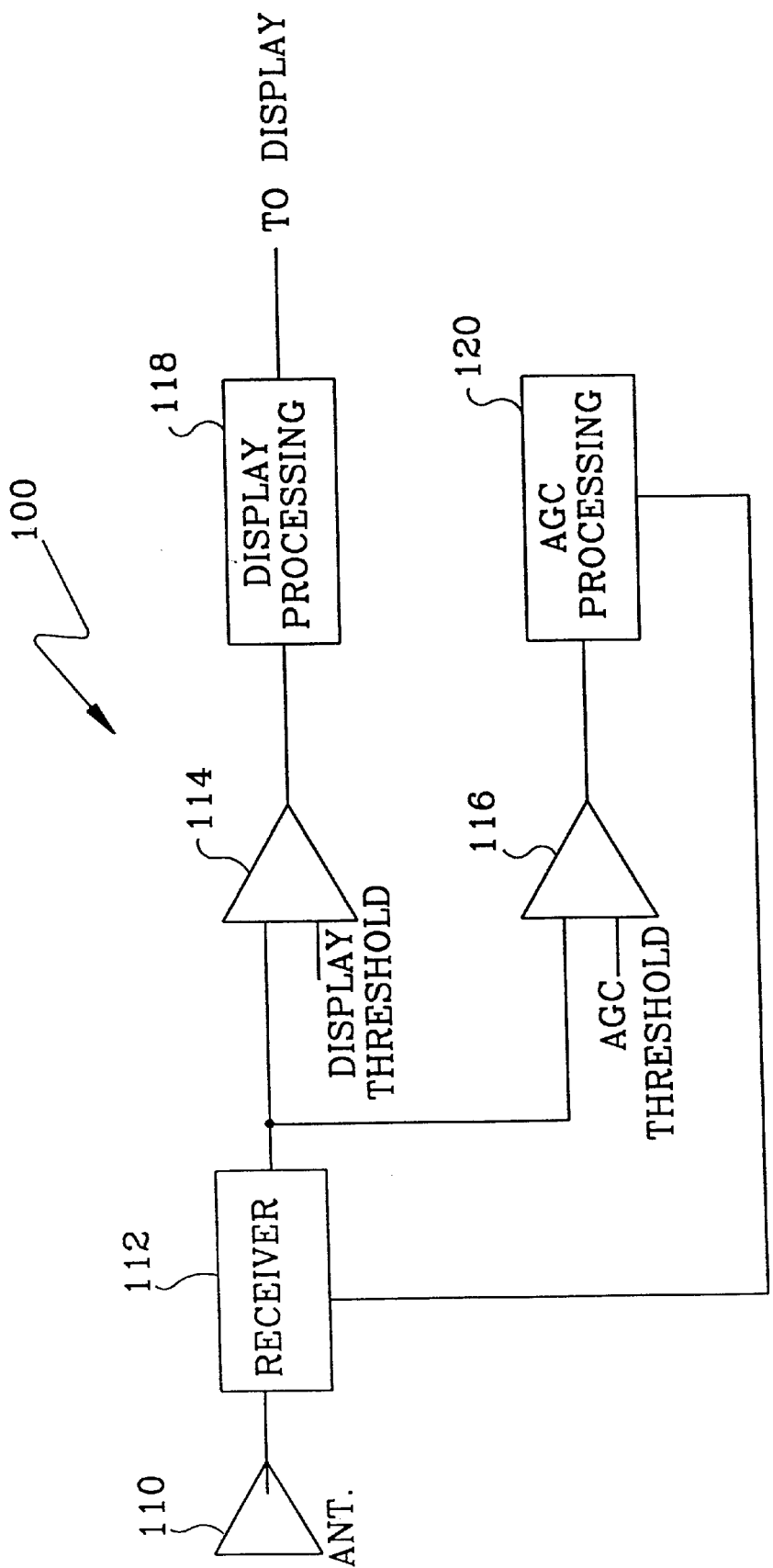
FIG. 1 is a general block diagram of a radar receiver system according to a typical prior art application.

To more fully explain the various aspects of the present invention, momentary reference to FIG. 1 and the typical prior art AGC system shown therein is made. Specifically, the present inventor has surprisingly discovered that the relationship between the AGC threshold provided to comparator 116 and the display threshold provided to display comparator 114 can be related, and in general, when they are it can be determined that the relationship depends on the probability distribution function of the receiver noise output. Specifically, the probability of a false alarm, i.e., the false alarm rate, prior to the display processing by processor 118 and the actual displayed false alarm rate have a fixed relationship in most implementations.

Specifically, the probability of false alarm can be related to the probability distribution function of the receiver output noise by the following relationship:

$$P_{FA} = Prob(n>T) = 1 - F_n(T) \tag{1}$$

where, n=noise sample $P_{FA}$=Probability of false alarm, for threshold T $F_n( )$=Cumulative probability distribution of receiver output noise.

T=Threshold value

Accordingly, assuming that the probability of the false alarm rate prior to the display processing is $P_1$, and that the actual displayed false alarm rate is $P_2$, since the purpose of the display processing conducted in processor 118 is to improve the signal-to-noise ratio by filtering noise, $P_2$ will be less than $P_1$. Further assuming that the display processing employs an "M-out-of-N" processing scheme, that is, if M or more returns from N RF transmission exceed the display threshold, a display indication is made, (e.g. N=12 and M=9), the relationship between $P_1$ and $P_2$ can be expressed by a Bernoulli Equation. That is, the probability, $P_2$, that M or more of the N data points exceed the display threshold, given that the probability of any one of the data points exceeding the threshold is $P_1$, can be expressed by the following Equation (2):

$$P_2 = \sum_{k=M}^{N} \binom{N}{k} P_1^k (1-P_1)^{N-k}. \tag{2}$$

In most implementations, the displayed false alarm rate has a fixed maximum. For example, if a generally accepted false alarm rate for the system is set to be equal to three (3) false alarms during any one antenna sweep, and it is assumed that a typical display has approximately 60,000 pixels, $P_2$ can be set equal to 0.00005. Accordingly from Equation (2), with $P_2$=0.00005, N=12 and M=9, and in accordance with various aspects of the present invention, $P_1$ would be set to 0.195. The surprising discovery of this fixed relationship between $P_1$ and $P_2$ can be used to improve the stabilization of the false alarm rate of radar system 200 as will now be described.

With reference again to FIG. 3, the display threshold is suitably selected and compared to the signal received from envelope detector 315, and the result of the comparison provided to processors 320 and 325. Appreciating that the magnitude of the gain, i.e., the output from processor 325, at any particular time is suitably based on a variety of factors, processor 325 adjusts the gain of IF stage 310 such that the adjustment is based upon a fixed input alarm rate (IAR) or input false alarm rate. For example, the microprocessors of processor 325 and processor 320, e.g., microprocessor 400, may access RAM or ROM to retrieve a predetermined IAR. In the preferred embodiment, however, the microprocessor accesses a fixed IAR, i.e., a pre-processed alarm rate which is set equal to $P_1$ from Equation 2. As previously noted when $P_1$=0.195, operator of processor 320 guarantees a displayed false alarm rate within an acceptable tolerance. (i.e., on the order of 0.00005 when $P_1$=0.195). By so configuring receiver system 300, acceptable gain control of IF stage 310 may also be accomplished, in accordance with accepted AGC processing techniques.

For example, in accordance with a preferred exemplary embodiment of the present invention, AGC processor 325 evaluates signals and adjusts IF stage 310 as necessary to maintain inter alia, the output of receiver is in line with the input alarm rate. That is if the IAR is set equal to 0.195 then for every 100 signals evaluated by processor 325, ideally 19.5 should exceed the threshold. Accordingly, if processor 325 detects an excess, then the gain of IF stage 310 is reduced; on other hand if processor 325 detects less than the prescribed amount, then the gain of IF stage 310 will be adjusted upwards. While in the context of this exemplary embodiment of the present invention the IAR is equal to 0.195 (or 19.590) it should be appreciated that any IAR number or predetermined range could be utilized.

In accordance with a preferred aspect of the present invention, and with reference to FIGS. 3 and 4, processor 220, specifically display processor 320 also suitably provides raw threshold values for analyzing signals received from envelope detector 315 via the ADC to comparator 330. In particular, processor 320 is suitably configured to establish various raw detection threshold values for targets of varying reflectivities at varying ranges based on the input power of the reflected wave at antenna 205. For example, processor 320 may determine the proper raw threshold values by calculating each threshold based on the relevant expected input power. Alternatively, ROM 410 or RAM 405 of processor 320 may include a table of raw threshold values corresponding to particular input power values. Consequently, based on an expected input power level, microprocessor 400 suitably determines the proper threshold by consulting the particular table stored therein.

In accordance with various aspects of the present invention, processor 320 is further configured to scale the raw threshold values based on the gain. In particular, microprocessor 400 is configured to adjust each raw threshold value according to the scheduled gain of the IF stage 300 to generate a scaled threshold value as explained more fully in application Ser. No. 08/730,431, filed Oct. 15, 1996, the subject matter of which is hereby incorporated by reference. Thus, each threshold value is automatically recalculated to correspond to the gain of the IF stage 310, regardless of the gain schedule implemented.

In accordance with various aspects of the present invention, the electrical signals corresponding to the detected waves generated in antenna 205 are transmitted to the IF stage 310 of radar receiver 215. Using automatic gain control processor 325, microprocessor 400 periodically adjusts the gain of IF stage 310 to optimize the dynamic range of receiver 215. Thus, if in the time interval immediately after the emission of a pulse from the target, the gain of the amplifier is very low, and a sufficient number of signals reflected from the target do not exceed the threshold. In the following time intervals, the gain of IF stage 310 will be adjusted upwards to offset the difference. The amplified signals from IF stage 310 are transmitted to envelope detector 315 and then to comparator 330 (as previously noted via an ADC). The signals are compared to the threshold values determined by processor 320. If the signals exceed any of the thresholds, the highest threshold exceeded is suitably noted. The signals are then processed according to various processing techniques and provided to a display, such as an operator interface.

Preferably the system 200 generally operates in accordance with predetermined time intervals (e.g., about 16 milliseconds), in which time intervals the system performs a prescribed set of functions, including the display processing and AGC processing functions which will now be described.

Figure 5:
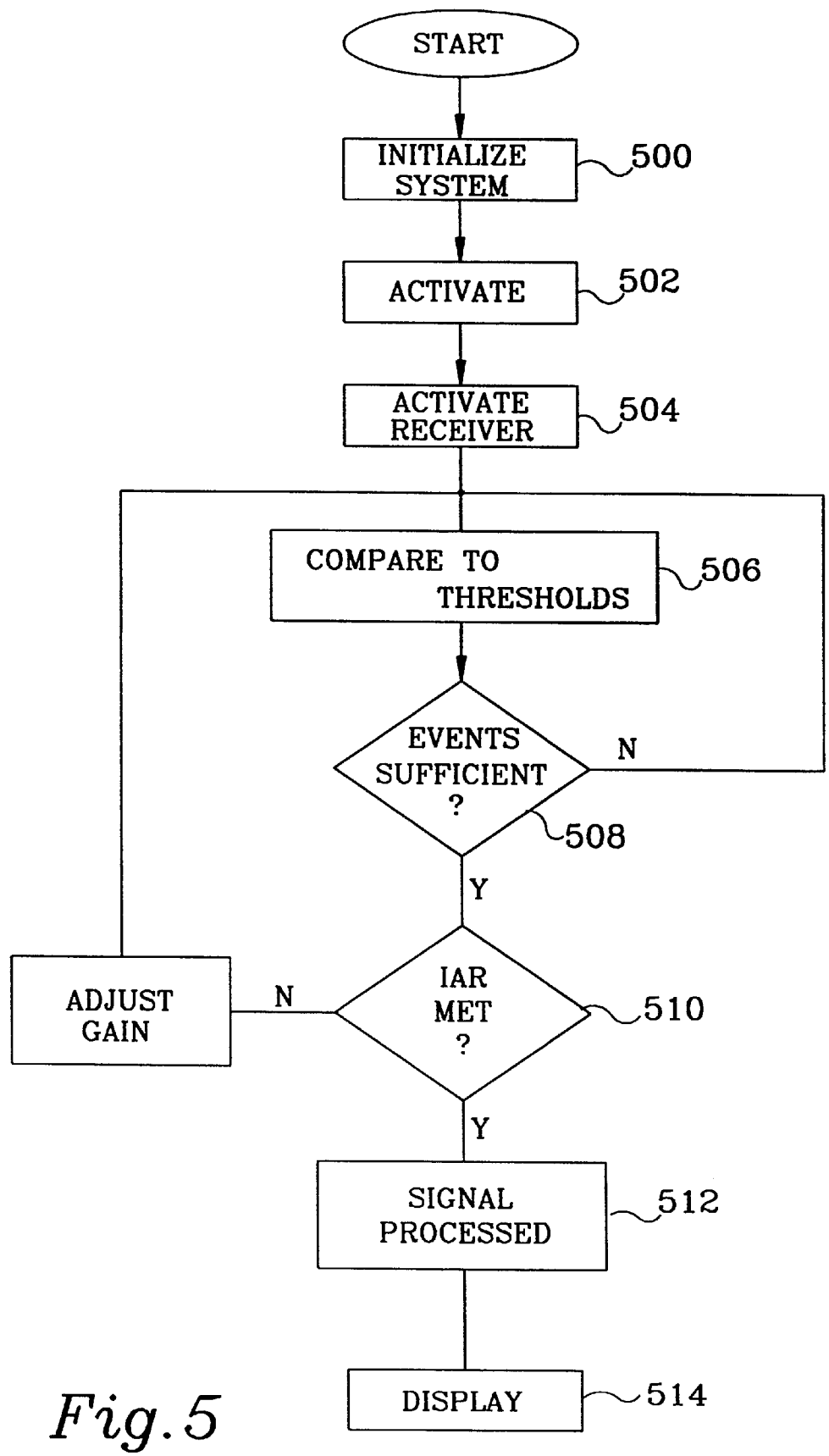
FIG. 5 is a flow chart of the operation of the display processing function of the radar system of FIG. 2.

Referring now to FIG. 5, in conjunction with FIGS. 2, 3, and 4 the display processing operation of a radar system 200 according to various aspects of the present invention is described. As shown, system 200 is initialized to prepare the system for operation (step 500). The initialization sets the gain of IF stage 310 and the threshold values to any appropriate initial states, and connects transmitter 210 to antenna 205 and disconnects receiver 215. After initialization, transmitter 210 is activated (step 502), which emits a pulse via antenna 205. As the pulse is generated, transmitter 210 is disconnected from antenna 205 and receiver 21 5 is activated (step 504).

Receiver 215 begins to monitor signals received from antenna 205 and as relevant signals are detected by envelope detector 315, the signals are transmitted to comparator 330 via an ADC. Microprocessor 400 of processor 320 accesses the memory for the corrected and scaled threshold values to determine whether the signal exceeds any of the display thresholds (step 506) and, if so, classifies the signal. If a prescribed number of events exceed the threshold (step 508), then the gain is evaluated to determine in the prescribed IAR is met (step 510). If the number of events are not exceeded, then additional comparisons are made; if the number of events exceed the threshold and the prescribed IAR is met, then the signal is then further processed (step 512) and, if appropriate, provided to the display 225 (step 514). If the IAR is not met, the AGC processor 325 suitably adjusts the gain of the IF stage 310.

Figure 6:
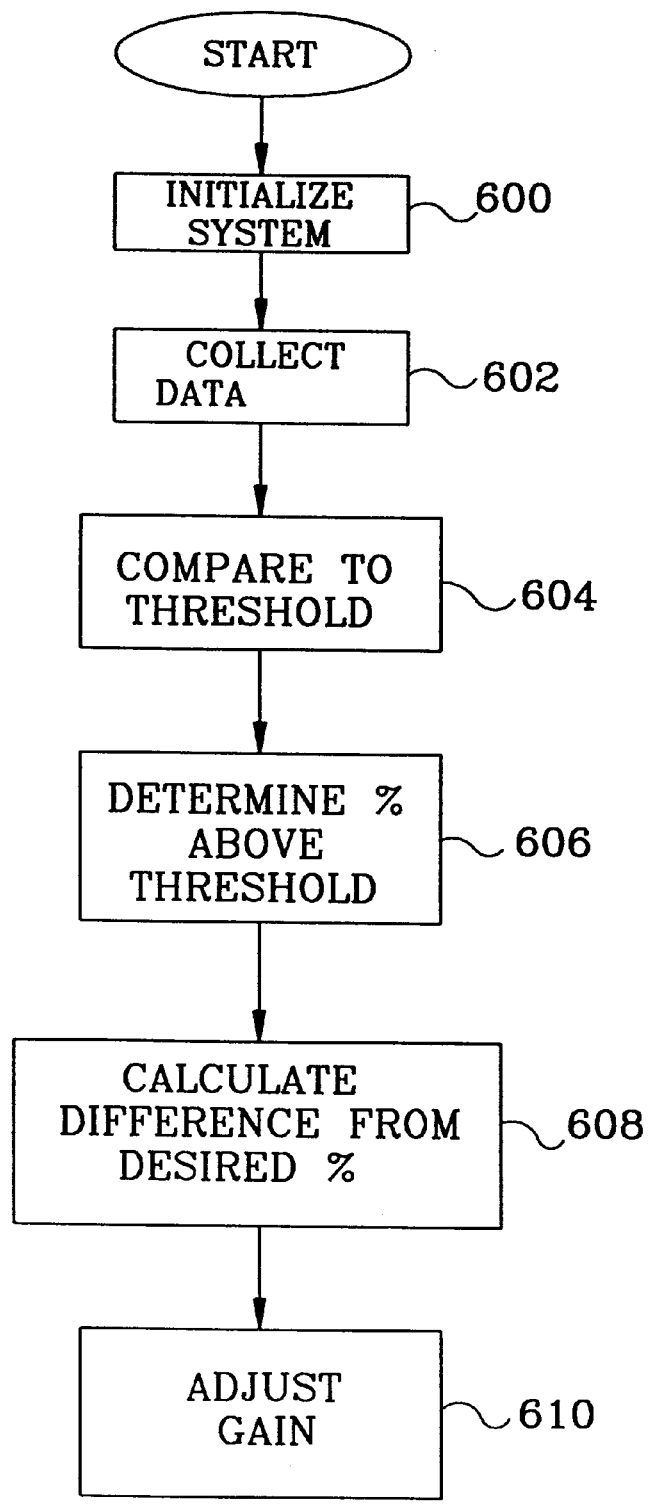
FIG. 6 is a flow chart of the operation of the AGC processing function of the radar system of FIG. 2.

Referring now to FIG. 6, in conjunction with FIGS. 2, 3, and 4 the AGC processing operation of system 200 will now be described. As shown, at the outset of a predetermined time interval, the system is initialized (step 602) thereby setting the IF stage 310 parameters for AGC processing, for example, the STC (i.e., Sensitivity Time Control) parameters may be set. Thereafter, data reflective of the noise signal is collected (step 604). Specifically, in accordance with preferred aspects of the present invention, the system, using an ADC, will sample the noise, generally by obtaining a plurality of discrete samples within each predetermined time interval, for example, on the order of 59 samples in each 16 millisecond interval. The samples are then subjected to dual threshold processing. Preferably, the samples are compared to the threshold (step 604) and the percentage of samples which are above (or below) the threshold is determined (step 606). Thereafter, the difference between the desired percentage of samples exceeding the threshold (in accordance with this exemplary embodiment 19.590) and the determined percentage of samples which exceed the threshold is calculated (step 608). The gain is then adjusted in direct proportion to the calculated difference (step 610). For example, if the difference is significant, then the gain will be adjusted upwards or downwards, as appropriate, in an aggressive manner. On the other hand, if the difference is zero, that is the percentage of samples which exceed the threshold at the desired percentage (e.g. 1.9.590), then the net adjustment of the gain is zero.

A radar system 200 according to various aspects of the present invention provides an advantageous system for controlling the false alarm rate of a radar receiver 215. In particular, radar receiver system 200 includes receiver 215 which can be configured to exhibit greater sensitivity. Because the false alarm rate is capable of being fixed, as described above, the receiver sensitivity can be enhanced without risk of achieving an impermissible false alarm rate. Such improvements may be on the order of about 1 to about 2 decibels.

With reference to Equation (1) above, as previously noted, typical prior art systems exhibit false alarm rates that are temperature dependent, because the distribution function $F_n$ (T) is dependent on receiver detector linearity and dc offsets, both of which can vary with temperature. By controlling the preprocessed false alarm rate, i.e., IAR, as herein described, however, there is no temperature dependence of the probability distribution of the noise, because the displayed false alarm rate is similarly fixed.

Moreover, the design and maintenance of the improved receiver system according to various aspects of the present invention is more cost-effective and easier to place into operation and maintain. Moreover, reliability of the system, particularly over time can be enhanced. Furthermore, a radar system 200 according to various aspects of the present invention exhibits improved versatility, because the system can operate in conjunction with a wide variety of receivers and operating characteristics.

While an exemplary embodiment of the present invention has now been described, there will be immediately obvious to those skilled in the art many modifications of structure, arrangements, proportions, the elements, materials and components, used in the practice of the invention which are particularly adapted for a specific environment and operating requirements without departing from the scope of the invention as set forth in the appended claims.

I claim:

1. A radar system for processing a radar wave reflected from a target, comprising:
   an antenna configured to collect the radar wave reflected from the target;
   a receiver coupled to said antenna, said receiver configured to process the radar wave based at least in part upon an adjustable gain, said receiver generating a receiver output having an input false alarm rate (P1), wherein said input false alarm rate ($P_1$) has a magnitude at least in part corresponding to said adjustable gain;
   a display processor configured to receive said receiver output and generate a display signal based at least in part on said receiver output, said display signal having an actual false alarm rate ($P_2$); and
   an automatic gain control (AGC) processor configured to receive said receiver output from said receiver and adjust said adjustable gain of said receiver in order to approximately maintain said input false alarm rate (P1) at a selected input false alarm rate level, wherein said selected input false alarm rate level is selected according to a fixed relationship with said actual false alarm rate (P2).

2. The apparatus of claim 1, wherein said receiver is a radar receiver.

3. The apparatus of claim 1, wherein said receiver comprises an intermediate frequency (IF) stage converter configured to convert the radar wave collected by said antenna to an intermediate frequency signal having an intermediate frequency.

4. The apparatus system of claim 3, wherein said receiver further comprises an amplifier connected to said IF stage converter and said antenna and an envelope detector connected to said IF stage converter.

5. The apparatus of claim 1, wherein said display processor employs an M-out-of-N processing scheme in generating said display signal that is utilized to generate said display of said target.

6. A radar receiver system for processing a target signal generated by an antenna in response to a radar wave reflected from a target, comprising:
   an amplifier responsive to the target signal generated by the antenna, said amplifier amplifying the target signal and producing an amplified target;
   an intermediate frequency (IF) stage configured to receive said amplified target signal, said IF stage processing said amplified target signal based at least in part upon an adjustable gain and producing an intermediate frequency signal having an intermediate frequency;
   an envelope detector responsive to said intermediate frequency signal from said IF stage, said envelope detector detecting a target signal corresponding to the radar wave reflected from the target and providing a detection signal in accordance with the detected target signal, said detection signal having an input false alarm rate ($P_1$); and
   a processing system responsive to said detection signal provided by said envelope detector, said processing system including:
   a comparator responsive to said detection signal provided by said envelope detector, said comparator comparing said detection signal to a threshold and providing a compared result;
   a display processor processing said compared result and communicating a processed compared result to a display corresponding to the radar wave reflected from the target, said processed compared result having an actual false alarm rate ($P_2$); and
   an automatic gain controller connected to said comparator, said automatic gain controller receiving said compared result and adjusting said adjustable gain of the IF stage in order to approximately maintain said input false alarm rate ($P_1$) at a selected input false alarm rate level, wherein said input false alarm rate level is selected according to a fixed relationship with said actual false alarm rate ($P_2$).

7. A method of processing a radar wave reflected from a target such that false alarms are minimized while sensitivity is maximized, comprising:
   (a) collecting the radar wave reflected from the target;
   (b) processing the radar wave based at least in part upon an adjustable gain such that an output is generated having a target component and a noise component, said target component corresponding to the radar wave reflected from the target and said noise component contributing to an input false alarm rate ($P_1$) of said output;
   (c) filtering said output noise component to improve a signal-to-noise ratio of said signal component and said noise component in order to produce a display signal that is utilized to generate a display of the target that has an actual false alarm rate ($P_2$); and
   (d) receiving and evaluating said output prior to filtering of said noise component and adjusting said adjustable gain in order to approximately maintain said input false alarm rate ($P_1$) at a selected input false alarm rate level, wherein said selected input false alarm rate level is selected according to a fixed relationship with said actual false alarm rate ($P_2$).

8. The method of claim 7, wherein said display signal is generated indicating a target presence if at least M returns received from N transmissions exceed a display threshold.

9. The method of claim 8, wherein said fixed relationship between said input false alarm rate (P1) and said actual false alarm rate (P2) is expressed by the following equation:

$$P_2 = \sum_{k=M}^{N} \binom{N}{k} P_1^k (1-P_1)^{N-k}$$

where:

N=number of transmissions by said radar system; and

M=minimum number of returns from N transmissions that are required to exceed a display threshold before said display signal is generated indicating a target presence.

10. The method of claim 8, wherein said fixed relationship between said input false alarm rate (P1) and said actual false alarm rate (P2) is expressed by the following equation:

$$P_2 = \sum_{k=M}^{N} \binom{N}{k} P_1^k (1-P_1)^{N-k}$$

where:

N=number of transmissions by said radar system; and

M=minimum number of returns from N transmissions that are required to exceed a display threshold before said display signal is generated indicating a target presence.

* * * * *